United States Patent
Schneider

(10) Patent No.: US 11,126,991 B2
(45) Date of Patent: Sep. 21, 2021

(54) SMART DATA CABLE FOR POINT OF SALE SYSTEMS

(71) Applicant: Copper Inc., Reno, NV (US)

(72) Inventor: Tobias Schneider, Reno, NV (US)

(73) Assignee: Copper Inc., Reno, NV (US)

( * ) Notice: Subject to any disclaimer, the term of this patent is extended or adjusted under 35 U.S.C. 154(b) by 0 days.

(21) Appl. No.: 17/092,112

(22) Filed: Nov. 6, 2020

(65) Prior Publication Data

US 2021/0056529 A1     Feb. 25, 2021

Related U.S. Application Data

(63) Continuation of application No. PCT/US2017/040288, filed on Jun. 30, 2017.

(Continued)

(51) Int. Cl.
*G06Q 20/30* (2012.01)
*G06Q 20/20* (2012.01)
(Continued)

(52) U.S. Cl.
CPC ......... *G06Q 20/305* (2013.01); *G06F 13/382* (2013.01); *G06Q 20/20* (2013.01); *G06Q 20/202* (2013.01); *G06Q 20/206* (2013.01); *G06Q 20/208* (2013.01); *G06Q 20/209* (2013.01); *G06Q 20/322* (2013.01); *G06Q 20/325* (2013.01); *G06Q 20/3276* (2013.01);
(Continued)

(58) Field of Classification Search
CPC ..................................................... G06Q 20/20
See application file for complete search history.

(56) References Cited

U.S. PATENT DOCUMENTS

| | | | |
|---|---|---|---|
| 5,818,426 | A | 10/1998 | Kirkwood et al. |
| 6,438,146 | B1 | 8/2002 | Brafford |

(Continued)

FOREIGN PATENT DOCUMENTS

WO     2016055117     4/2016

OTHER PUBLICATIONS

International Preliminary Report on Patentability, dated Jan. 10, 2019, from corresponding International Application No. PCT/US2017/040288.

(Continued)

*Primary Examiner* — Allen C Chein
(74) *Attorney, Agent, or Firm* — Brient IP Law, LLC

(57) ABSTRACT

Various embodiments are described herein that relate to network-connected data cables (i.e., "smart" data cables) that are connected to a merchant's point of sale system and a receipt printer. When a transaction is initiated at the point of sale system, transaction data is created by the point of sale system and passed to the smart data cable for transmission downstream to the receipt printer. The smart data cable can parse the transaction data, copy certain elements from the transaction data, and transmit the copied elements to a cloud-based platform that processes the transaction. For example, the cloud-based platform may compare the copied elements to information supplied by the customer through a messaging application executing on the customer's user device. The information may be provided by the customer to a chat bot that is supported by the cloud-based platform.

20 Claims, 5 Drawing Sheets

Related U.S. Application Data

(60) Provisional application No. 62/357,319, filed on Jun. 30, 2016, provisional application No. 62/361,966, filed on Jul. 13, 2016, provisional application No. 62/361,974, filed on Jul. 13, 2016.

(51) Int. Cl.

| | | |
|---|---|---|
| *G06Q 20/32* | (2012.01) | |
| *G06Q 30/06* | (2012.01) | |
| *G06Q 30/04* | (2012.01) | |
| *G06F 13/38* | (2006.01) | |
| *G06Q 20/42* | (2012.01) | |
| *G06Q 50/12* | (2012.01) | |
| *G06Q 20/40* | (2012.01) | |
| *G07G 1/12* | (2006.01) | |

(52) U.S. Cl.
CPC ... *G06Q 20/3278* (2013.01); *G06Q 20/40145* (2013.01); *G06Q 20/42* (2013.01); *G06Q 30/04* (2013.01); *G06Q 30/0635* (2013.01); *G06Q 50/12* (2013.01); *G07G 1/12* (2013.01)

(56) References Cited

U.S. PATENT DOCUMENTS

| | | | |
|---|---|---|---|
| 6,801,975 | B1 | 10/2004 | Young |
| 7,114,153 | B2 | 9/2006 | Nijdam |
| 7,127,541 | B2 | 10/2006 | Govindarajulu et al. |
| 7,308,522 | B2 | 12/2007 | Heynemann et al. |
| 7,648,067 | B2 | 1/2010 | Nobutani |
| 7,702,974 | B2 | 4/2010 | Warren |
| 7,898,988 | B2 | 3/2011 | Boatright et al. |
| 8,301,196 | B2 | 10/2012 | Kauffman et al. |
| 8,548,859 | B2 | 10/2013 | Matkovic |
| 8,626,593 | B2 | 1/2014 | Goldfinger et al. |
| 8,713,338 | B2 | 4/2014 | Mobin et al. |
| 9,198,215 | B2 | 11/2015 | Gantman et al. |
| 9,208,481 | B2 | 12/2015 | Arzumanyan et al. |
| 9,979,566 | B2 | 5/2018 | Rothermel et al. |
| 2001/0012289 | A1 | 8/2001 | Norman |
| 2011/0307342 | A1* | 12/2011 | Haji ............... G06Q 20/209 705/24 |
| 2012/0191522 | A1* | 7/2012 | McLaughlin ......... G06Q 50/01 705/14.23 |
| 2012/0316950 | A1 | 12/2012 | Laporte et al. |
| 2013/0112743 | A1 | 5/2013 | Cavin et al. |
| 2013/0317835 | A1* | 11/2013 | Mathew ............... G16H 20/10 705/2 |
| 2014/0195359 | A1* | 7/2014 | Schulz ............... G06Q 30/04 705/16 |
| 2019/0173811 | A1* | 6/2019 | Estrada ............... H04L 51/38 |

OTHER PUBLICATIONS

International Search Report, dated Sep. 19, 2017, from corresponding International Application No. PCT/US2017/040288.

Written Opinion, dated Sep. 19, 2017, from corresponding International Application No. PCT/US2017/040288.

Office Action, dated Jul. 6, 2021, from corresponding U.S. Appl. No. 17/313,202.

Restriction Requirement, dated Jul. 9, 2021, from corresponding U.S. Appl. No. 17/313,231.

Notice of Allowance, dated Jul. 22, 2021, from corresponding U.S. Appl. No. 17/313,202.

Office Action, dated Aug. 6, 2021, from corresponding U.S. Appl. No. 17/313,200.

* cited by examiner

SMART DATA CABLE FOR POINT OF SALE SYSTEMS

CROSS-REFERENCE TO RELATED APPLICATIONS

This application is a continuation of PCT Application No. PCT/US2017/040288, filed Jun. 30, 2017, entitled "SMART DATA CABLE FOR POINT OF SALE SYSTEMS," the contents of which are incorporated herein by reference.

This application claims the benefit of the filing date of U.S. Provisional Application 62/357,319, filed Jun. 30, 2016 and entitled "SMART DATA CABLE FOR POINT OF SALE SYSTEMS," the contents of which are incorporated herein by reference.

This application claims the benefit of the filing date of U.S. Provisional Application 62/361,966, filed Jul. 13, 2016 and entitled "CHAT BOT FOR PROCESSING PAYMENT TRANSACTIONS COMPLETED USING A MESSAGING APPLICATION," the contents of which are incorporated herein by reference.

This application claims the benefit of the filing date of U.S. Provisional Application 62/361,974, filed Jul. 13, 2016 and entitled "RECOGNITION TECHNIQUES FOR PROCESSING PAYMENT TRANSACTIONS COMPLETED USING A MESSAGING APPLICATION," the contents of which are incorporated herein by reference.

FIELD OF THE INVENTION

Various embodiments concern smart data cables that are connected to other devices or networks and, more specifically, smart data cables for point of sale systems that enable merchants to accept mobile payments from customers.

BACKGROUND

There are approximately 635,000 bars and restaurants in the United States that generated nearly $710 billion in total sales in 2015. With the prevalence of Internet, a large number of consumers have migrated at least a part of their conventional shopping (e.g., for consumer products) from traditional, physical shops into online stores. Henceforth, many consumers have begun moving away from conventional payment processes when completing transactions (e.g., online payment transactions). In light of this, a number of payment processing systems, such as PayPal™, can now process commercial transactions initiated or completed online (e.g., through websites or using email). However, many of the customers are unable to enjoy the same kind of convenience that they enjoy from shopping online when they visit these bars and restaurants, because only 15% of bars and restaurants currently accept mobile payments.

On the other hand, while there are over 3 billion monthly active users of mobile messaging applications (many of which utilize online payments), few mobile messaging users are able to make online payments for offline applications, such as restaurants, in an automated manner. There have been attempts to replace the traditional point-of-sale (POS) systems with "smart" POS systems, such as those that can receive mobile payments and/or send receipts electronically to customers. However, the low adoption rate of such smart POS system can be attribute to numerous issues, including high fragmentation of necessary infrastructure, high implementation costs for merchants (e.g., investment on existing equipment, and/or deployment costs including staff training), and low customer acceptance of a proposed solution (e.g., resistance to change existing behavior, or reluctance to have new software applications installed on personal phones simply for payment purposes).

BRIEF DESCRIPTION OF THE DRAWINGS

Various objects, features, and characteristics will become apparent to those skilled in the art from a study of the Detailed Description in conjunction with the appended claims and drawings, all of which form a part of this specification. While the accompanying drawings include illustrations of various embodiments, the drawings are not intended to limit the claimed subject matter.

Figure 1:
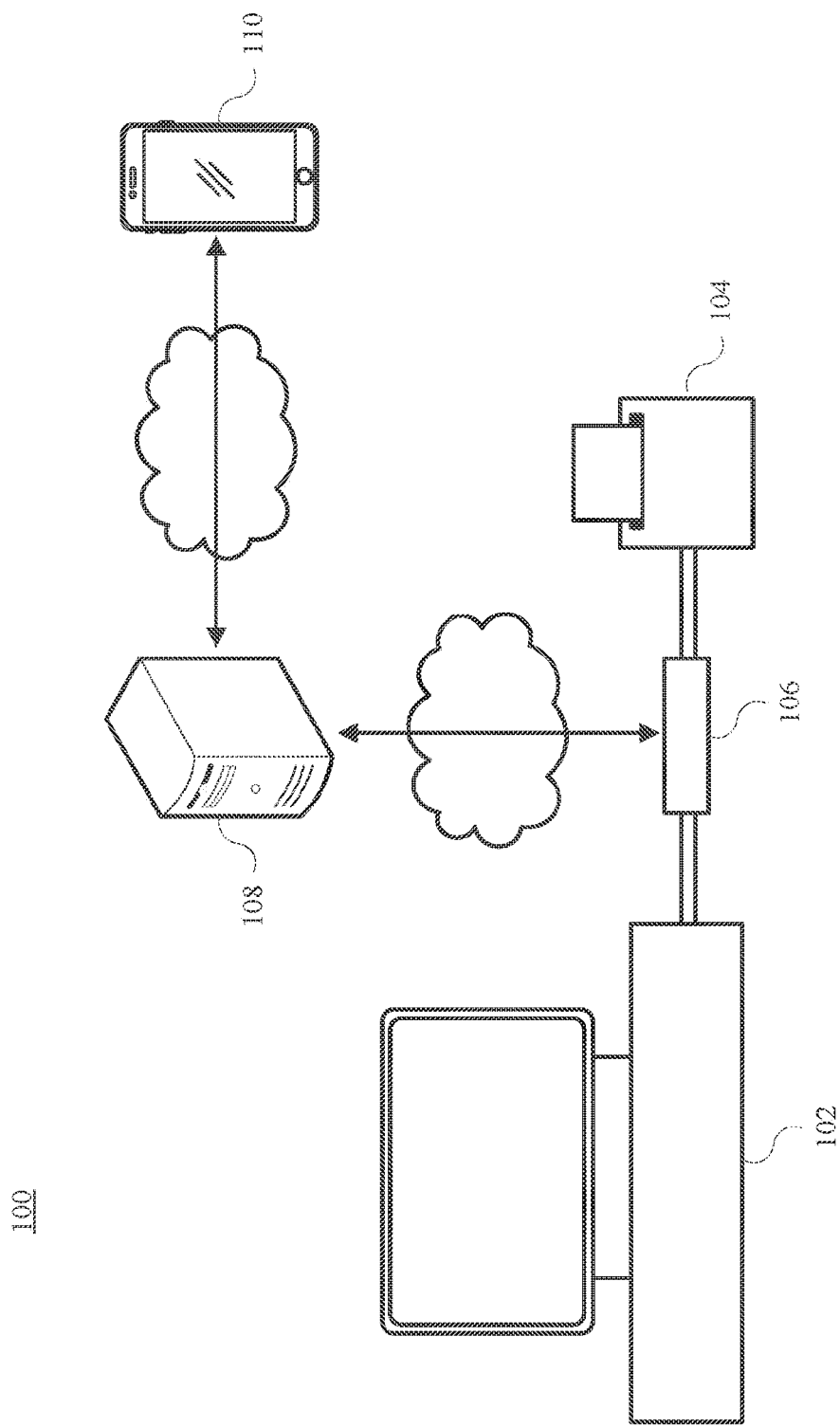
FIG. 1 is a generalized illustration of a network environment that includes a point of sale system connected to a receipt printer by a smart data cable and a network-accessible server.

The figures depict various embodiments described throughout the Detailed Description for the purposes of illustration only. While specific embodiments have been shown by way of example in the drawings and are described in detail below, the invention is amenable to various modifications and alternative forms. The intention is not to limit the invention to the particular embodiments described. Accordingly, the claimed subject matter is intended to cover all modifications, equivalents, and alternatives falling within the scope of the invention as defined by the appended claims.

DETAILED DESCRIPTION

Various embodiments are described herein that relate to data cables that are connected to electronic devices or networks via different wireless protocols, such as Bluetooth, near field communication (NFC), WiFi, 3G/4G, etc. These "smart" data cables may be able to operate interactively and autonomously with the electronic devices to which the smart data cables are connected.

The smart data cables described herein are designed to replace the existing data cable between a merchant's point of sale system and the receipt printer. When transaction data is transmitted to the receipt printer from the point of sale system, the smart data cable can copy certain elements from the transaction data and transmit the copied data to a web server or cloud-based storage. Such a technique may enable merchants to more readily accept mobile payments from customers.

For example, when the receipt is brought to a customer, the customer may open a messaging application executing on the customer's user device (e.g., a mobile phone, tablet, or laptop). The customer can then initiate a chat with a chat bot supported by the web server. More specifically, the customer can take a picture of the receipt and post the picture to the chat. After the chat bot receives the picture of the receipt, various recognition (e.g., optical character recognition) techniques can be performed so that basic information can be extracted from the picture of the receipt. The web server then compares the basic information extracted from the picture of the receipt to the elements of transaction data copied by the smart data cable.

Once a match has been found, the chat bot has access to sufficient information (e.g., the amount due and restaurant name) to allow the user to pay for the receipt through a conversational interface presented by the user device. For example, if the receipt is private (i.e., for a single customer), the chat bot may ask for the customer's credit card information or for confirmation of the payment amount, tip, etc., if the customer has previously conducted transactions using the chat bot. However, if the receipt is shared (i.e., for multiple customers), the chat bot may ask how the receipt should be split between the multiple customers.

Responsive to processing the transaction, the chat bot can send confirmation to the customer(s), the merchant, or both. For example, the chat bot may respond to the customer(s) directly (i.e., within the conversational interface) by sending a message that states, "Transaction completed. You're all set!" The merchant, meanwhile, can be notified via a message (e.g., a chat message delivered to an individual associated with the merchant, such as a manager) or by sending a notification to the smart data cable that causes a confirmation to be printed by the receipt printer.

The embodiments described herein provide numerous, technical advantages over existing mobile payment solutions. For instance, setup fees may be minimal or non-existent because the smart data cables interface with the merchant's existing infrastructure (e.g., point of sale device). Moreover, the chat bot may be available on a variety of messaging platforms, which ensures that consumers need not download an additional messaging application that is developed solely for completing transactions. Other benefits of using a smart data cable include business incentives (e.g., more streamlined transaction experiences for both customers and merchants) and customer relation incentives (e.g., direct customer communication and feedback may be receivable through the chat channel managed by the chat bot).

Various embodiments may be described with reference to particular system configurations (e.g., point of sale systems for restaurants) and networks. However, one skilled in the art will recognize that features described herein are equally applicable to other system configurations, network types, merchant types, etc. Moreover, the techniques introduced herein can be embodied as special-purpose hardware (e.g., circuitry), programmable circuitry appropriately programmed with software and/or firmware, or as a combination of special-purpose and programmable circuitry. Hence, embodiments may include a machine-readable medium having stored thereon instructions which may be used to program a computer (or some other computing device) to perform a process. The machine-readable medium may include, but is not limited to, floppy diskettes, optical disks, compact disk read-only memories (CD-ROMs), magneto-optical disks, read-only memories (ROMs), random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

Terminology

Brief definitions of terms, abbreviations, and phrases used throughout this application are given below.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described that may be exhibited by some embodiments and not by others. Similarly, various requirements are described that may be requirements for some embodiments but not others.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. For example, two devices may be coupled directly, or via one or more intermediary channels or devices. As another example, devices may be coupled in such a way that information can be passed there between, while not sharing any physical connection with one another. Additionally, the words "herein," "above," "below," and words of similar import, when used in this application, shall refer to this application as a whole and not to any particular portions of this application. Where the context permits, words in the Detailed Description using the singular or plural number may also include the plural or singular number respectively. The word "or," in reference to a list of two or more items, covers all of the following interpretations of the word: any of the items in the list, all of the items in the list, and any combination of the items in the list.

If the specification states a component or feature "may," "can," "could," or "might" be included or have a characteristic, that particular component or feature is not required to be included or have the characteristic.

The term "module" refers broadly to software, hardware, or firmware (or any combination thereof) components. Modules are typically functional components that can generate useful data or other output using specified input(s). A module may or may not be self-contained. An application program (also called an "application") may include one or more modules, or a module can include one or more application programs.

The terminology used in the Detailed Description is intended to be interpreted in its broadest reasonable manner, even though it is being used in conjunction with certain examples. The terms used in this specification generally have their ordinary meanings in the art, within the context of the disclosure, and in the specific context where each term is used. For convenience, certain terms may be highlighted, for example using capitalization, italics, and/or quotation marks. The use of highlighting has no influence on the scope and meaning of a term; the scope and meaning of a term is the same, in the same context, whether or not it is highlighted. It will be appreciated that same element can be described in more than one way.

Consequently, alternative language and synonyms may be used for any one or more of the terms discussed herein, and special significance is not to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

System Topology Overview

FIG. 1 is a generalized illustration of a network environment 100 that includes a point of sale system 102 connected to a receipt printer 104 by a smart data cable 106 and a network-accessible server 108. Together, the smart data cable 106 and the server 108 enable customers to pay for goods and/or services provided by the merchant associated with the point of sale system 102 using a mobile messaging application 110, such as Facebook™ Messenger, SnapChat™, and WhatsApp™. The mobile messaging application 110 is executed by the operating system of a user device 110 associated with a customer.

The smart data cable 106 (also referred to as a "tapping device") is connected to the point of sale system 102 and the receipt printer 104, as well as the server 108. The smart data cable 106 may be communicatively coupled to these components via wired or wireless connections. For example, the smart data cable 106 can be physically connected to the point of sale system 102 and the receipt printer 104 (e.g., via USB or serial ports) and wirelessly connected to the server 108 (e.g., via the Internet). Accordingly, the smart data cable 106 can be connected to one or more local area networks (LANs), wide-area networks (WANs), metropolitan area networks (MANs), and/or the Internet. In some embodiments, the smart data cable 106 can include a single multiplexed hardware interface to be physically connected to the point of sale system 102 and the receipt printer 104. The single multiplexed hardware interface can support multiple cable-based connections (e.g., USB, serial, and/or parallel ports). Additionally or alternatively, the smart data cable 106 can communicate with the point of sale system 102 and/or the receipt printer 104 via Bluetooth, NFC, etc.

When a transaction is initiated at the point of sale system 102 (e.g., by hitting a "print check" button on the point of sale system 102), the point of sale system 102 creates transaction data. The transaction data can include a manifest of goods and/or services that are purchased, a payment amount, a merchant name, a time and date of the transaction, and/or any other suitable information that would appear on a transaction receipt for purposes of identifying the details of the transaction. The transaction data can then be transmitted from the point of sale system 102 to the receipt printer 104 via the smart data cable 106, which can capture certain elements of the transaction data and transmit those captured elements to the server 108. Such a technique enables the customer(s) to complete the transaction using a messaging service or application, rather than present a payment card to the merchant.

When transaction data is transmitted to the receipt printer 104 from the point of sale system 102, the smart data cable 106 can copy elements of the transaction data and transmits those elements to the server 108. For example, the smart data cable 106 may identify and copy information required to process the transaction, such as the payment amount and the credit card number (which may be used by the server 108 to identify the customer).

The server 108 can then process the transaction using the copied elements of transaction data. For example, the server 108 may browse user accounts and/or a database of transactions to determine whether the payment card was used in a previous transaction. If a match is found, the server 108 may prompt the customer to simply confirm the transaction (e.g., by sending the customer a message to be presented by the user device 110). However, if no match is found, the server 108 may request additional information from the customer. For example, the server 108 may support a chat bot that asks the customer for the credit card number, CVV, etc. Such information can be used by the server 108 to process the transaction and create an account on behalf of the customer. The account may include personal or financial information that enables future transactions to be more quickly and easily processed.

Responsive to processing the transaction, the server 108 can send a confirmation to the customer, the merchant, or both. For example, a chat bot may respond to the customer directly by sending a message via a mobile messaging application that states, "Transaction completed. You're all set!" The merchant can be notified via a message (e.g., a chat message delivered to an individual associated with the merchant, such as a manager) or by sending a notification to the smart data cable 106 that causes a confirmation to be printed by the receipt printer 104. One skilled in the art will recognize that the chat bot can also collectively or individually communicate with multiple customers involved in a single transaction.

Generally, the presence of the smart data cable 106 is entirely transparent to the point of sale system 102 and the receipt printer 104. That is, the smart data cable 106 may appear to be one or more connected devices from the perspective of the point of sale device 102. For instance, the smart data cable 106 could appear as multiple connected devices (e.g., a receipt printer and a card reader) from the perspective of the point of sale device 102. The receipt printer 104, meanwhile, typically doesn't recognize any devices upstream in the transaction flow and, thus, may not even acknowledge the presence of the smart data cable 106. Because the smart data cable 106 parses the transaction data to copy certain elements and then passes the unaltered transaction data downstream to the receipt printer 104, neither point of sale system 102 nor the receipt printer 104 may be aware of the smart data cable's presence. Moreover, the main functionality of the receipt printer 104 (e.g., reliably printing receipts) can be guaranteed at any point, regardless of the other functions enabled by the smart data cable 106. Thus, even if the smart data cable 106 fails (e.g., loses network connectivity), the merchant can continue to print receipts and complete payment transactions as would conventionally be done (e.g., by swiping a payment card at the point of sale device 102).

In some embodiments, the smart data cable 106 can share network services with other devices. For example, the smart data cable 106 could share WiFi and/or Bluetooth connectivity with a customer's user device in order to allow the customer to utilize mobile payment services facilitated by the smart data cable even if the customer's user device is not otherwise connected to a network (e.g., no cell service is available). The smart data cable 106 could also share network services with the point of sale device 102 and/or the receipt printer 104.

While the user device 110 is depicted as a mobile phone, one skilled in the art will recognize that other electronics can also be used. For instance, the user device 110 can be (or be facilitated by) a tablet, laptop, personal computer, network-connected ("smart") television, game console (e.g., Sony PlayStation™ or Microsoft Xbox™ game console), network-connected mobile gaming device (e.g., Sony PSP™), television-connected device (e.g., Roku™, Apple TV™, Google Chromecast™, Amazon FireStick™, Android TV™, Blu-ray disc players), another network-accessible device having an interface (e.g., Apple iPod Touch™, Apple Watch™), etc.

Figure 2:
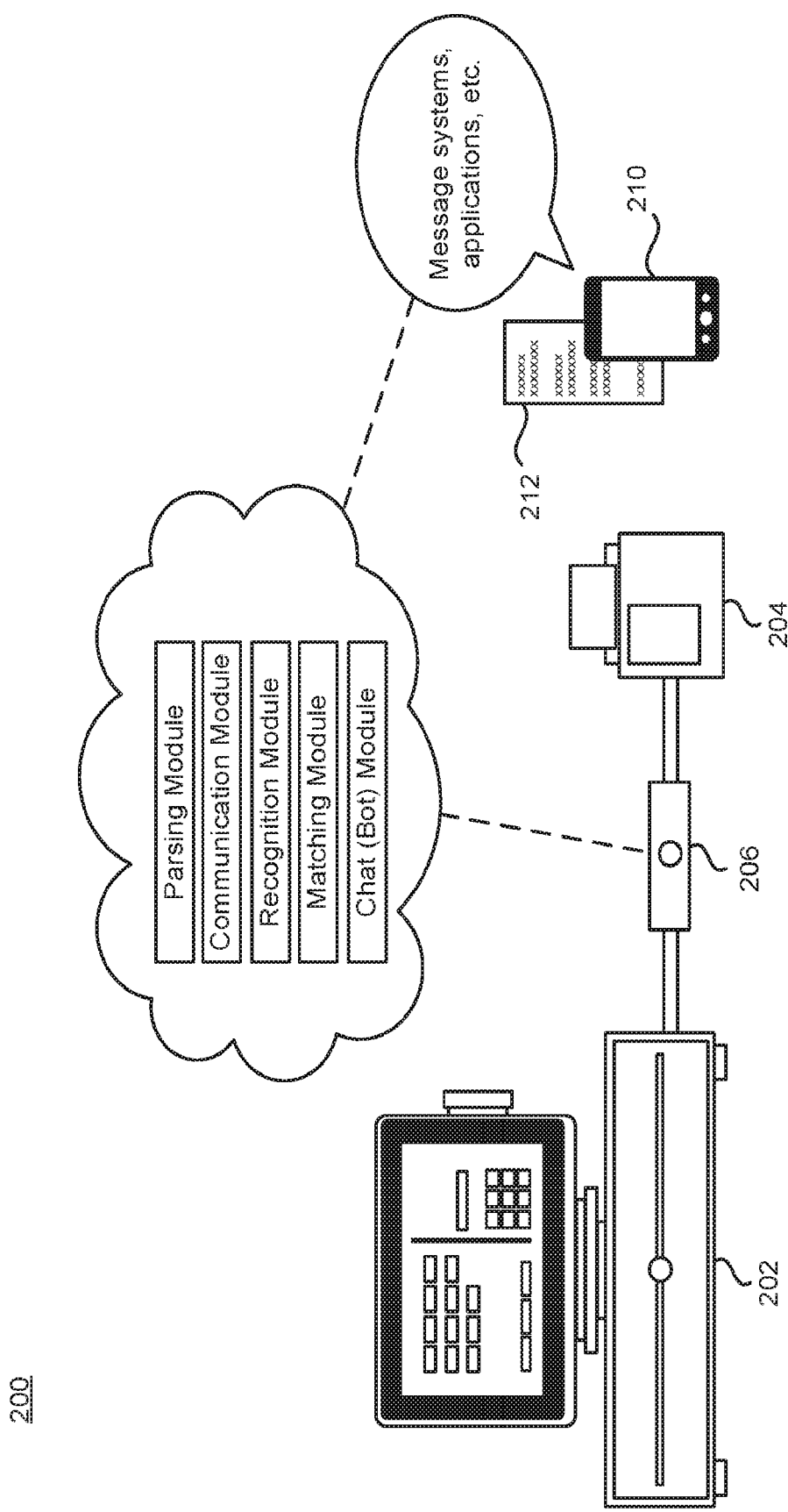
FIG. 2 is another generalized illustration of a network environment that includes a point of sale system connected to a receipt printer by a smart data cable.

FIG. 2 is another generalized illustration of a network environment 200 that includes a point of sale system 202 connected to a receipt printer 204 by a smart data cable 206. The smart data cable 206 can be seamlessly integrated into the merchant's point of sale environment by replacing a pre-existing cable that extends between the point of sale system 202 and the receipt printer 204. Note, however, that in some embodiments the smart data cable 206 communicates with the point of sale system 202 and/or the receipt printer 204 via wireless connections and, thus, need not be physically connected to such components. In such embodiments, the smart data cable 206 may include a wireless communication module that enables communication via Bluetooth, NFC, etc.

The smart data cable 206 typically receives power from either the point of sale system 202 or the receipt printer 204. However, in some embodiments (e.g., where the smart data cable 206 is wirelessly coupled to both components), the smart data cable 206 may have a physical power interface, such as a plug or jack.

As shown here, the smart data cable 206 may be able to connect to point of sale systems and printers of different types, having different operating systems, etc. Moreover, the smart data cable 206 may be able to parse transaction data transmitted form the point of sale system 202 to the receipt printer 204 regardless of format and copy elements of the transaction data needed to process the transaction. The copied elements can be transmitted to a cloud-based platform that processes transactions between customers and merchants. The cloud-based platform may be responsible for supporting a chat bot that communicates with customer(s) using a messaging service (e.g., email) or a messaging application (e.g., Facebook™ Messenger, SnapChat™, WhatsApp™, Slack™, Hipchat™) and enables the customer (s) to pay for goods and/or services provided by a merchant using a conversational interface presented by the user device 210.

More specifically, when the receipt 212 is brought to a customer, the customer may open a messaging application executing on the customer's user device 210 (e.g., a mobile phone, tablet, or laptop). The customer can then initiate a chat with a chat bot managed by the cloud-based platform. For example, the customer can take a picture of the receipt 212 and post the picture to the chat. After the chat bot receives the picture of the receipt, various recognition (e.g., optical character recognition) techniques can be performed so that basic information can be extracted from the picture of the receipt 212. The cloud-based platform can then compare the basic information extracted from the picture of the receipt 210 to the elements of transaction data copied by the smart data cable 206. The messaging application may be accessible through some combination of a web browser, software program, mobile application, and over-the-top (OTT) application.

Once a match has been found, the chat bot has access to sufficient information (e.g., the amount due and restaurant name) to allow the customer to pay for the receipt through a conversational interface presented by the user device 210. For example, if the receipt is private (i.e., for a single customer), the chat bot may ask for the customer's credit card information or for confirmation of the payment amount, tip, etc. However, if the receipt is shared (i.e., for multiple customers), the chat bot may ask how the receipt should be split between the multiple customers.

Responsive to processing the transaction, the chat bot can send a confirmation to the customer(s), the merchant, or both. For example, the chat bot may respond to each customer directly (i.e., within the conversational interface) by sending a message that states, "Transaction completed. You're all set!" The merchant, meanwhile, can be notified via a message delivered to an employee or by sending a notification to the smart data cable 206 that causes a confirmation to be printed by the receipt printer 204.

Figure 3:
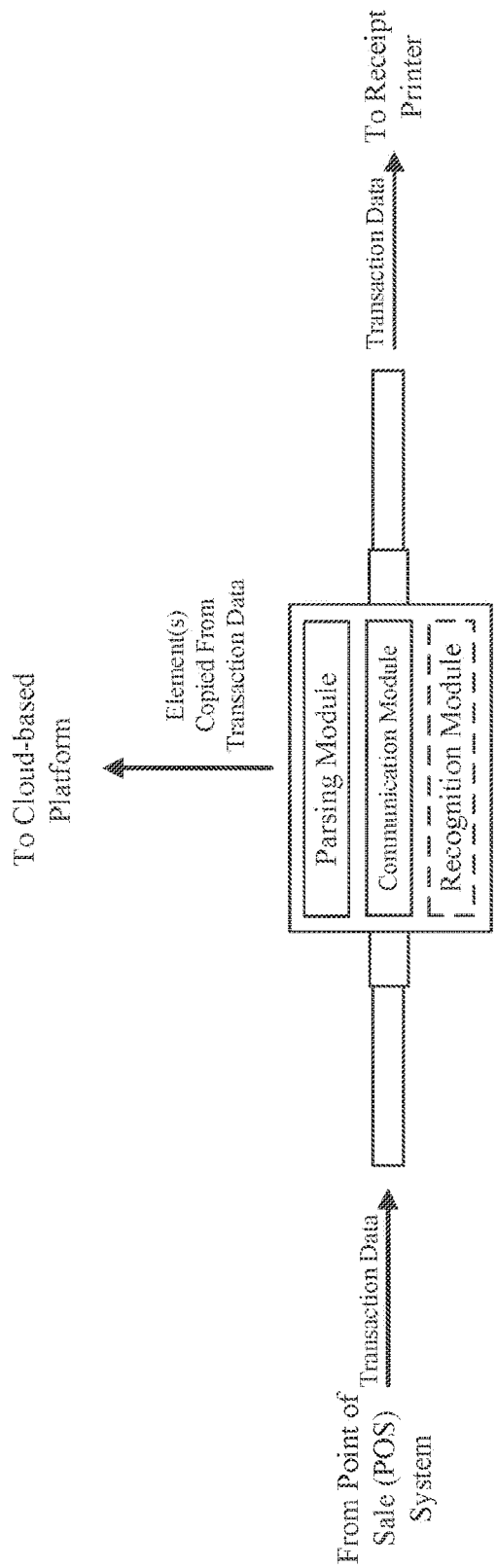
FIG. 3 depicts how a smart data cable parses data passed between a point of sale system and a receipt printer.

FIG. 3 depicts how a smart data cable parses data passed between a point of sale system and a receipt printer. The smart data cable can include a parsing module for processing data received from the point of sale system and a communication module for establishing a (secure) communication link with a network-accessible server. In some embodiments, the smart data cable also includes a recognition module that performs one or more recognition techniques on data received by the cable (e.g., from the point of sale system or from the network-accessible server).

As transaction data is passed from the point of sale system to the receipt printer, the transaction data can be parsed by the smart data cable. The smart data cable may copy certain element(s) required to process the transaction. Because the elements represent copies of the transaction data, the transaction data can be passed to the receipt printer unaltered. The copied elements can include a manifest of goods and/or services that are purchased, a payment amount, a merchant name, a time and date of the transaction, and/or any other suitable information that would appear on a transaction receipt for purposes of identifying the details of the transaction.

As noted above, the cloud-based platform can use the element(s) copied from the transaction data to process a transaction completed by the customer using a mobile messaging application. In some embodiments, the copied element(s) can be used by the cloud-based platform as confirmation that information specified by the customer through one or more messages is correct.

Figure 4:
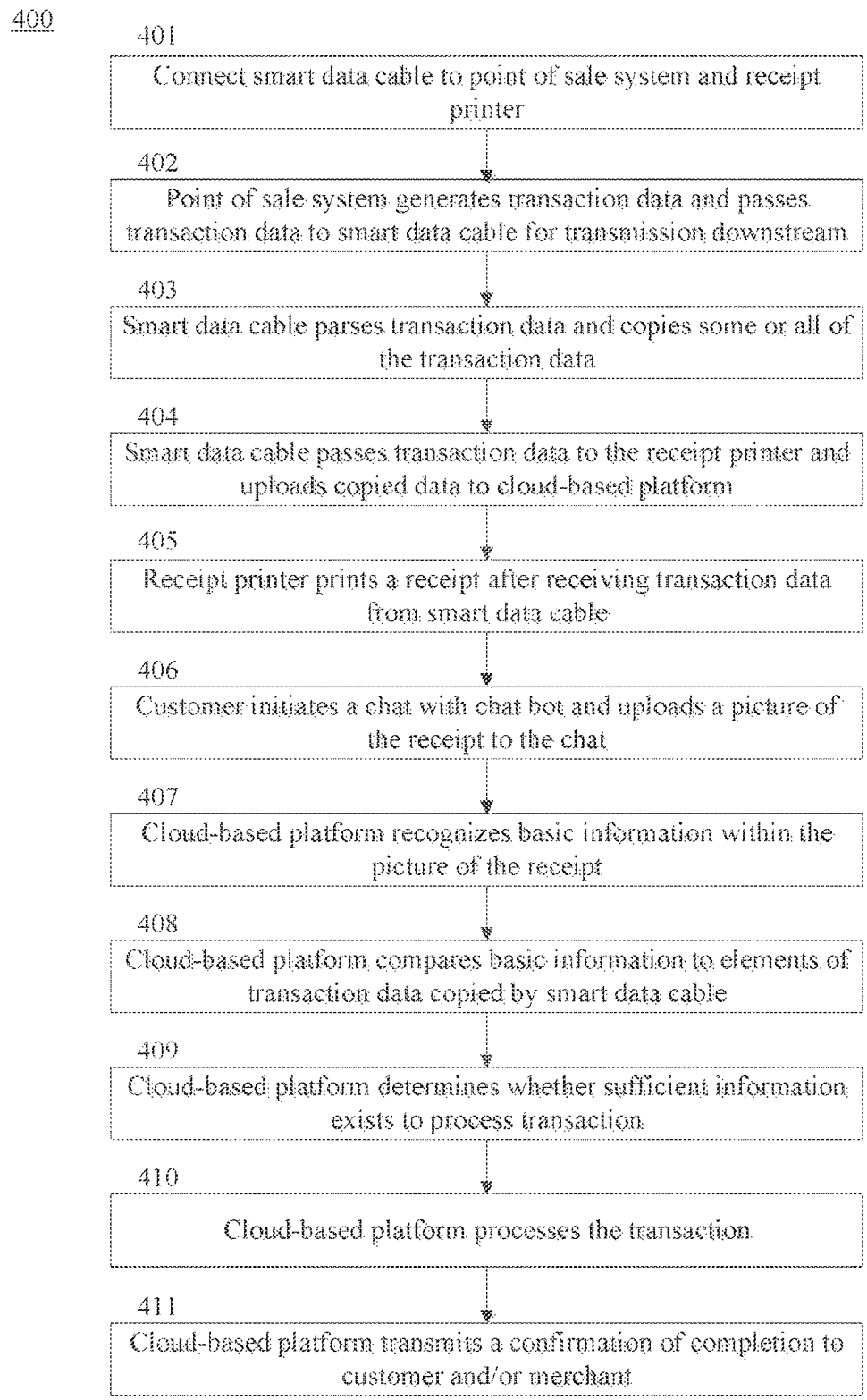
FIG. 4 depicts a flow diagram of a process for processing a transaction completed using a messaging application.

FIG. 4 depicts a flow diagram of a process 400 for processing a transaction completed using a messaging application. Initially, a smart data cable is connected to a point of sale system and a receipt printer (step 401). For example, the smart data cable can be physically (e.g., via USB or serial ports) or wirelessly (e.g., via Bluetooth or NFC) coupled to the point of sale system and the receipt printer.

When a transaction is initiated at the point of sale system, the point of sale system generates transaction data and passes the transaction data to the smart data cable for transmission downstream to the receipt printer (step 402). The transaction can be initiated responsive to the merchant selecting a "print check" button at the point of sale system. The smart data cable can then parse the transaction data and copy some or all of the transaction data (step 403). For example, the smart data cable may only copy the information needed to process the transaction (e.g., the amount to be paid and/or an itemized list of the goods and/or services purchased).

The smart data cable then passes the unmodified transaction data to the receipt printer and uploads the copied data to a cloud-based platform (step 404). This enables the cloud-based platform to assist in processing the transaction between the merchant and the customer. In some embodiments, the receipt printer prints a receipt after receiving the transaction data from the smart data cable (step 405).

When the receipt is brought to a customer, the customer may open a messaging application executing on the customer's user device (e.g., a mobile phone, tablet, or laptop). The customer can then initiate a chat with a chat bot supported by the cloud-based platform by uploading a picture of the receipt to the chat (step 406). As noted above, the chat bot may be compatible with any messaging application capable of being executed by the customer's user device.

After the chat bot receives the picture of the receipt, various recognition (e.g., optical character recognition techniques) can be performed by the cloud-based platform so that basic information can be extracted from picture of the receipt (step 407). In some embodiments, the recognition techniques are instead performed by the user device and the basic information extracted from the picture of the receipt is uploaded to the cloud-based platform for review. The chat bot can then compare the basic information extracted from the picture of the receipt to the elements of transaction data copied by the smart data cable (step 408).

Once a match has been found, the cloud-based platform determines whether it has access to sufficient information (e.g., the amount due and the merchant name or identifier) to facilitate processing of the transaction (step 409). For example, if the cloud-based platform does not have sufficient information, the chat bot may ask for the customer's credit card information or CVV. However, if the cloud-based platform does have sufficient information, the chat bot may simply ask for confirmation of the payment amount, tip, etc. The cloud-based platform can process the transaction after retrieving or acquiring the necessary information (step 410).

Responsive to processing the transaction, the chat bot can send a confirmation to the customer, the merchant, or both (step 411). For example, the chat bot may respond to the customer directly (i.e., within the conversational interface) by sending a message that states, "Transaction completed. You're all set!" The merchant can be notified via a message (e.g., a chat message delivered to an individual associated with the merchant, such as a cashier or manager) or by sending a notification to the smart data cable that causes a confirmation to be printed by the receipt printer.

Unless contrary to physical possibility, it is envisioned that the steps described above may be performed in various sequences and combinations. For instance, the customer may post a picture of the receipt to the chat before the smart data cable has uploaded the copied elements of transaction data. Other steps can also be included in some embodiments.

Computer System

Figure 5:
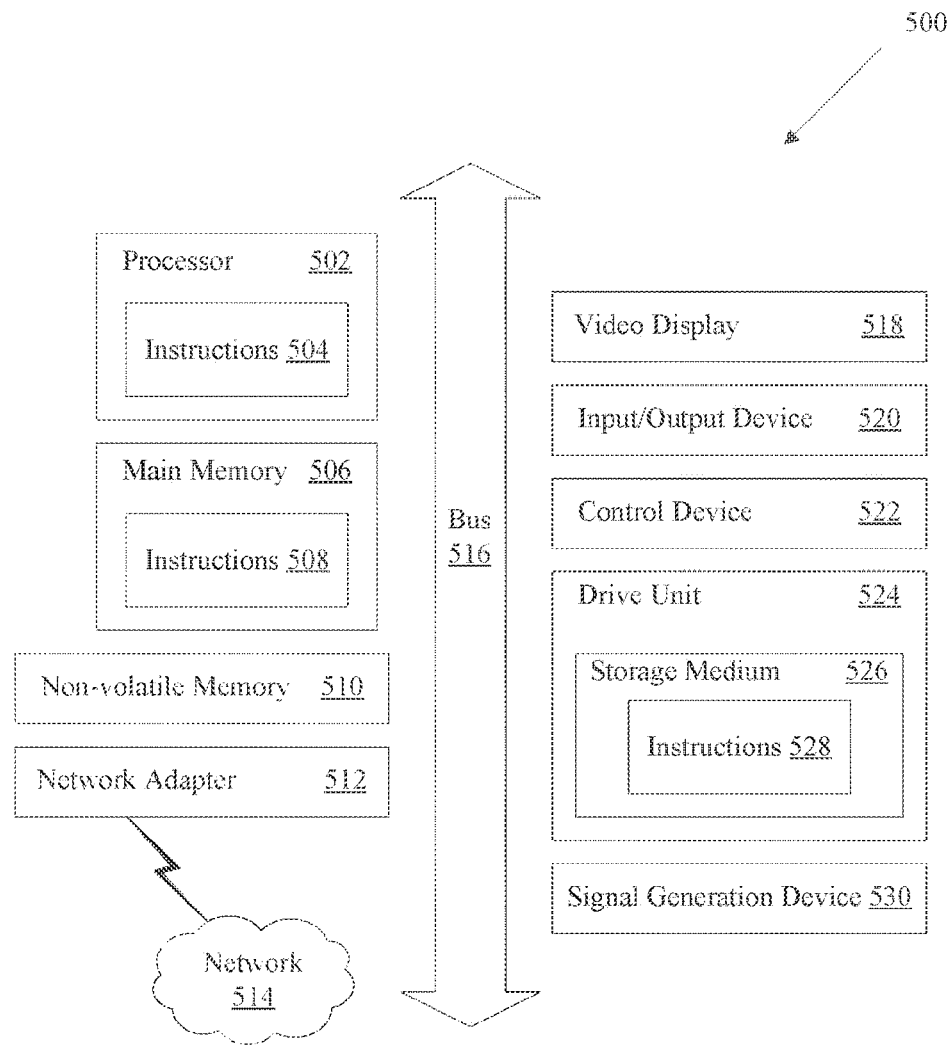
FIG. 5 is a block diagram illustrating an example of a computer system in which at least some operations described herein can be implemented.

FIG. 5 is a block diagram illustrating an example of a computing system 500 in which at least some operations described herein can be implemented. The computing system may include one or more central processing units ("processors") 502, main memory 506, non-volatile memory 510, network adapter 512 (e.g., network interfaces), video display 518, input/output devices 520, control device 522 (e.g., keyboard and pointing devices), drive unit 524 including a storage medium 526, and signal generation device 530 that are communicatively connected to a bus 516. The bus 516 is illustrated as an abstraction that represents any one or more separate physical buses, point to point connections, or both connected by appropriate bridges, adapters, or controllers. The bus 516, therefore, can include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire."

In various embodiments, the computing system 500 operates as a standalone device, although the computing system 500 may be connected (e.g., wired or wirelessly) to other machines. In a networked deployment, the computing system 500 may operate in the capacity of a server or a client machine in a client-server network environment, or as a peer machine in a peer-to-peer (or distributed) network environment.

The computing system 500 may be a server computer, a client computer, a personal computer (PC), a user device, a tablet PC, a laptop computer, a personal digital assistant (PDA), a cellular telephone, an iPhone, an iPad, a Blackberry, a processor, a telephone, a web appliance, a network router, switch or bridge, a console, a hand-held console, a (hand-held) gaming device, a music player, any portable, mobile, hand-held device, or any machine capable of executing a set of instructions (sequential or otherwise) that specify actions to be taken by the computing system.

While the main memory 506, non-volatile memory 510, and storage medium 526 (also called a "machine-readable medium) are shown to be a single medium, the term "machine-readable medium" and "storage medium" should be taken to include a single medium or multiple media (e.g., a centralized or distributed database, and/or associated caches and servers) that store one or more sets of instructions 528. The term "machine-readable medium" and "storage medium" shall also be taken to include any medium that is capable of storing, encoding, or carrying a set of instructions for execution by the computing system and that cause the computing system to perform any one or more of the methodologies of the presently disclosed embodiments.

In general, the routines executed to implement the embodiments of the disclosure, may be implemented as part of an operating system or a specific application, component, program, object, module or sequence of instructions referred to as "computer programs." The computer programs typically comprise one or more instructions (e.g., instructions 504, 508, 528) set at various times in various memory and storage devices in a computer, and that, when read and executed by one or more processing units or processors 502, cause the computing system 500 to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include, but are not limited to, recordable type media such as volatile and non-volatile memory devices 510, floppy and other removable disks, hard disk drives, optical disks (e.g., Compact Disk Read-Only Memory (CD ROMS), Digital Versatile Disks, (DVDs)), and transmission type media such as digital and analog communication links.

The network adapter 512 enables the computing system 500 to mediate data in a network 514 with an entity that is external to the computing device 500, through any known and/or convenient communications protocol supported by the computing system 500 and the external entity. The network adapter 512 can include one or more of a network adaptor card, a wireless network interface card, a router, an access point, a wireless router, a switch, a multilayer switch, a protocol converter, a gateway, a bridge, bridge router, a hub, a digital media receiver, and/or a repeater.

The network adapter 512 can include a firewall which can, in some embodiments, govern and/or manage permission to access/proxy data in a computer network, and track varying levels of trust between different machines and/or applications. The firewall can be any number of modules having any combination of hardware and/or software components able to enforce a predetermined set of access rights between a particular set of machines and applications, machines and machines, and/or applications and applications, for example, to regulate the flow of traffic and resource sharing between these varying entities. The firewall may additionally manage and/or have access to an access control list which details permissions including for example, the access and operation rights of an object by an individual, a machine, and/or an application, and the circumstances under which the permission rights stand.

Other network security functions can be performed or included in the functions of the firewall, can include, but are not limited to, intrusion-prevention, intrusion detection, next-generation firewall, personal firewall, etc.

As indicated above, the techniques introduced here implemented by, for example, programmable circuitry (e.g., one or more microprocessors), programmed with software and/or firmware, entirely in special-purpose hardwired (i.e., non-programmable) circuitry, or in a combination or such forms. Special-purpose circuitry can be in the form of, for example, one or more application-specific integrated circuits (ASICs), programmable logic devices (PLDs), field-programmable gate arrays (FPGAs), etc.

Remarks

The foregoing description of various embodiments of the claimed subject matter has been provided for the purposes of illustration and description. It is not intended to be exhaustive or to limit the claimed subject matter to the precise forms disclosed. Many modifications and variations will be apparent to one skilled in the art. Embodiments were chosen and described in order to best describe the principles of the invention and its practical applications, thereby enabling others skilled in the relevant art to understand the claimed subject matter, the various embodiments, and the various modifications that are suited to the particular uses contemplated.

Although the above Detailed Description describes certain embodiments and the best mode contemplated, no matter how detailed the above appears in text, the embodiments can be practiced in many ways. Details of the systems and methods may vary considerably in their implementation details, while still being encompassed by the specification. As noted above, particular terminology used when describing certain features or aspects of various embodiments should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless those terms are explicitly defined herein. Accordingly, the actual scope of the invention encompasses not only the disclosed embodiments, but also all equivalent ways of practicing or implementing the embodiments under the claims.

The language used in the specification has been principally selected for readability and instructional purposes, and it may not have been selected to delineate or circumscribe the inventive subject matter. It is therefore intended that the scope of the invention be limited not by this Detailed Description, but rather by any claims that issue on an application based hereon. Accordingly, the disclosure of various embodiments is intended to be illustrative, but not limiting, of the scope of the embodiments, which is set forth in the following claims.

What is claimed is:

1. An apparatus comprising:
a smart data cable configured to replace a cable previously connecting a point-of-sale system and a printer, the smart data cable comprising:
   a first connection that communicatively couples the smart data cable to the point-of-sale system;
   a second connection that communicatively couples the smart data cable to the printer, the point-of-sale system configured to:
      generate transaction data for a transaction, the transaction data having a format with which the printer is compatible, and
      send the transaction data for receipt by the printer;
   a third connection that communicatively couples the smart data cable to a payment processing server; and
   circuitry configured within the smart data cable, the circuitry comprising a communications module comprising wireless communications circuitry configured to establish a wireless communications link with the payment processing server using the third connection, the circuitry coupled to the first, second and third connections and configured to:
      receive the transaction data from the point-of-sale system using the first connection,
      parse the transaction data and identify one or more elements of the transaction data therein regardless of the format,
      generate the transaction processing information comprising the one or more elements of the transaction data,
      transmit the transaction processing information to the payment processing server using the third connection for processing by the payment processing server,
      receive, from the payment processing server using the third connection, a confirmation that the payment processing server has processed the transaction using: (a) the transaction processing information, and (b) data that the payment processing server received from a device associated with a customer associated with the transaction, and
      at least partially in response to receiving the confirmation, transmit one or more of the one or more elements of the transaction data and additional transaction data comprising an indication of the confirmation using the second connection to the printer,
      wherein the printer is configured to generate a receipt comprising the one or more of the one or more elements of the transaction data and the indication of the confirmation, and
      wherein the smart cable is in the form of a cable that is adapted to extend between the point-of-sale system and the printer.

2. The apparatus of claim 1, wherein the first connection is a physical connection that physically connects the smart data cable to the point-of-sale system.

3. The apparatus of claim 2, wherein the smart data cable connects to the point-of-sale system using one of a USB port or a serial port.

4. The apparatus of claim 1, wherein the circuitry configured within the smart data cable is further configured to receive power from the point-of-sale system using the first connection.

5. The apparatus of claim 1, wherein the circuitry configured within the smart data cable further comprises a recognition module configured to perform recognition on data received by the circuitry.

6. The apparatus of claim 1, wherein the circuitry configured within the smart data cable is configured to send additional data to the printer, such that the transaction data and a representation of the additional data are included on the receipt generated by the printer.

7. The apparatus of claim 6, wherein the transaction involves a merchant and a customer, and wherein the additional data comprises a machine-readable element that is provided by the payment processing server.

8. A system comprising:
a printer;
a point-of-sale system, the point-of-sale system configured to generate transaction data for a transaction, the transaction data having a format with which the printer is compatible, and send the transaction data for receipt by the printer; and
an apparatus comprising:
a first connection that communicatively couples the apparatus to the point-of-sale system;
a second connection that communicatively couples the apparatus to the printer;
a third connection that communicatively couples the apparatus to at least one payment processing server configured to process the transaction using transaction processing information; and
circuitry coupled to the first, second and third connections, the circuitry configured to:
receive the transaction data from the point-of-sale system using the first connection,
parse the transaction data and identify one or more elements of the transaction data therein regardless of the format,
generate the transaction processing information so that the generated transaction processing information comprises the one or more elements of the transaction data;
using the third connection to transmit the transaction processing information to the at least one payment processing server for processing by the at least one payment processing server,
using the third connection to receive, from the at least one payment processing server, a confirmation that the at least one payment processing server has processed the transaction using: (a) the transaction processing information, and (b) data that the at least one payment processing server received from a device associated with a customer associated with the transaction, and
at least partially in response to receiving the confirmation, using the second connection to transmit one or more of the one or more elements of the transaction data and additional transaction data that comprises an indication of the confirmation for receipt by the printer, wherein the printer is configured to generate a receipt comprising the one or more of the one or more elements of the transaction data and the indication of the confirmation.

9. The system of claim 8, wherein the apparatus comprises a cable having the circuitry somewhere thereon, and wherein the first connection is a physical connection that physically connects the cable to the point-of-sale system.

10. The apparatus of claim 9, wherein the cable connects to the point-of-sale system using a respective USB port or a serial port, and wherein the cable replaces a USB cable or a serial cable that previously connected the point-of-sale system and the printer to each other.

11. The system of claim 8, wherein each of the first, second and third connections is a wireless connection that wirelessly connects the apparatus to the point-of-sale system, the printer, or the server, respectively.

12. A method comprising:
receiving, by a computing device from a point-of-sale system, transaction data for a transaction between a merchant and a customer, the transaction data having a format with which a first printer associated with the point-of-sale system is compatible;
parsing, by the computing device, the transaction data to identify one or more elements of the transaction data therein regardless of the format;
generating, by the computing device, transaction processing information so that the generated transaction processing information comprises the one or more elements of the transaction data;
transmitting, by the computing device, the transaction processing information to a payment processing server that is configured to process the transaction using the transaction processing information;
receiving, by the computing device from the payment processing server, a confirmation that the payment processing server has processed the transaction using: (a) the transaction processing information, and (b) data that the payment processing server received from a device associated with the customer; and
at least partially in response to receiving the confirmation, transmitting, by the computing device, one or more of the one or more elements of the transaction data and additional transaction data comprising an indication of the confirmation to a second printer, wherein the second printer is configured to generate a receipt comprising both the one or more of the one or more elements of the transaction data and the indication of the confirmation.

13. The method of claim 12, wherein the one or more elements of the transaction data comprises unaltered transaction data.

14. The method of claim 12, further comprising using a cable when receiving the transaction data, the cable physically connected to the point-of-sale system.

15. The method of claim 14, wherein the cable connects to the point-of-sale system using a respective USB port or a serial port, and wherein using the cable comprises replacing a USB cable or a serial cable that previously connected the point-of-sale system and the first printer to each other.

16. The method of claim 12, further comprising using at least one wireless connection to the point-of-sale system and the payment processing server, when receiving the transaction data and when transmitting the transaction processing information, respectively.

17. The method of claim 12, further comprising transmitting additional data to the second printer, wherein the second printer is configured to generate the receipt further comprising a representation of the additional data.

18. The method of claim 17, wherein the representation is a machine-readable element that is associated with the payment processing server.

19. The method of claim 18, wherein the machine-readable element corresponds to an identifier for the merchant.

20. The method of claim 12, further comprising providing the confirmation to the merchant.

* * * * *